(12) United States Patent
Huang et al.

(10) Patent No.: US 8,806,414 B2
(45) Date of Patent: Aug. 12, 2014

(54) METHOD AND SYSTEM FOR LAYOUT PARASITIC ESTIMATION

(75) Inventors: Mu-Jen Huang, Taipei (TW); Yu-Sian Jiang, Kaohsiung (TW); Yi-Ting Lin, Hsinchu (TW); Hsien-Yu Tseng, Tongxiao Township, Miaoli County (TW); Heng Kai Liu, Pingzhen (TW); Chien-Wen Chen, Hsinchu (TW); Chauchin Su, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 35 days.

(21) Appl. No.: 13/484,480

(22) Filed: May 31, 2012

(65) Prior Publication Data

US 2013/0326447 A1    Dec. 5, 2013

(51) Int. Cl.
*G06F 17/50*    (2006.01)

(52) U.S. Cl.
USPC ............ 716/136; 716/106; 716/110; 716/115

(58) Field of Classification Search
CPC . G06F 17/50; G06F 17/5009; G06F 17/5036; G06F 17/5045; G06F 17/5068; G06F 17/5081
USPC ................. 716/100, 106–108, 110–111, 136, 716/114–115; 703/13–14
See application file for complete search history.

(56) References Cited

U.S. PATENT DOCUMENTS

| | | | |
|---|---|---|---|
| 2003/0069722 A1* | 4/2003 | Beattie et al. | 703/14 |
| 2009/0007035 A1* | 1/2009 | Su et al. | 716/5 |
| 2009/0326873 A1* | 12/2009 | Wang et al. | 703/1 |
| 2013/0227501 A1* | 8/2013 | Yang et al. | 716/102 |

OTHER PUBLICATIONS

Parasitic element (electrical networks), retrieved from Wikipedia, http://en.wikipedia.org/wiki/Parasitic_element_(electrical_networks), 2 pages.
Ghai, D. et al., "Parasitic Aware Process Variation Tolerant Voltage Controlled Oscillator (VCO) Design", ISQED '08 Proceedings of the 9th International Symposium on Quality Electronic Design, 2008, pp. 330-333.
Jangkrajarng, N. et al., "Template-Based Parasitic-Aware Optimization and Retargeting of Analog and RF Integrated Circuit Layouts", ICCAD, Nov. 2006, San Jose, CA., 7 pages.

* cited by examiner

*Primary Examiner* — Paul Dinh
(74) *Attorney, Agent, or Firm* — Duane Morris LLP; Steven E. Koffs

(57) ABSTRACT

A system comprises an electronic design automation (EDA) tool, for generating a schematic design of an integrated circuit (IC), generating a layout from the schematic design, editing the layout, and verifying the schematic design and layout. At least one non-transitory, computer readable storage medium, is provided for storing data representing the schematic design and the layout, the layout having a network of routing paths connecting at least two active layer devices of the IC design. An RC tool is provided for computing estimated parasitic capacitances of the routing paths of the network before verifying the schematic design and layout, and for inserting a capacitor corresponding to the estimated parasitic capacitance into the data representing the schematic design of the IC. A first device level simulation tool for simulating performance of the network based on the at least two active layer devices and the estimated parasitic capacitances.

20 Claims, 6 Drawing Sheets ability of circuit designs grow and the number
of transistor gates increases in nanometer technology, the
verification procedures become more time-consuming and
impractical.

METHOD AND SYSTEM FOR LAYOUT PARASITIC ESTIMATION

FIELD

This disclosure relates to integrated circuit (IC) design generally, and more specifically to automated tools and design flows for generating and verifying IC designs.

BACKGROUND

The field of IC design has advanced to allow designers to rapidly design and verify circuits, with extensive use of standard, reusable components and design flows. Electronic design automation (EDA) tools allow the designer to develop a design at a relatively high level of abstraction (e.g., register-transfer-level (RTL) or gate-level), generate a transistor-level schematic level design, and verify performance at the transistor level (a pre-layout simulation). Then the tool generates a layout and performs various verification tasks. The circuit designer runs design rule checks (DRC) and layout-versus-schematic (LVS) checks. After the layout is "DRC and LVS clean," the circuit designer runs resistance-capacitance (RC) extraction to obtain the parasitic capacitance values from the layout. The overall circuit performance including layout parasitics is finally obtained by running the post-layout simulation.

Parasitics (computed during RC extraction) are carefully taken into account when high-precision and/or high-speed circuits are laid out. In nanometer CMOS designs, parasitic loading and cross-talk effects can seriously degrade circuit performance. These effects can include gain-bandwidth, frequency, setup/hold time, and slew rate. If the post-layout simulation indicates that the layout does not meet performance specifications when the parasitic capacitances are taken into account, the designer may make a change to the front-end (active device layer) design and repeat the verification analysis, which is time consuming.

DETAILED DESCRIPTION

This description of the exemplary embodiments is intended to be read in connection with the accompanying drawings, which are to be considered part of the entire written description.

As the complexity of circuit designs grow and the number of transistor gates increases in nanometer technology, the verification procedures become more time-consuming and impractical.

Methods and tools described herein provide earlier and more accurate estimation of the layout parasitics to enable a designer to complete a high-quality product design faster.

An "RC module" 518 (FIG. 5) is provided to allow the designer to compute estimated parasitic capacitances and use a parasitic-aware design methodology, prior to performing the verification tasks (DRC/LVS/LPE and RCX), and prior to performing post-layout simulation. The calculation of parasitics in the RC module is based on back-end-of-line (BEOL) interconnect models and technology files, and in particular, does not rely on the outputs of running RC extraction on the IC design.

To assist the designer using the parasitic-aware flow, the RC module 518 renders a display of a subset of the IC (e.g., a time-critical network selected by the designer) in schematic form, annotated with the estimated parasitic RC value(s) shown as a lumped component (capacitor) on the schematic diagram. This lumped capacitor representation of the parasitic capacitance is also inserted into the schematic description of the network (e.g., inserted into the netlist), for inclusion in a pre-layout (FEOL) simulation.

This methodology enables a short physical-logical iteration path, and thus, faster design convergence can be achieved. The estimated parasitic RC values are provided in near-real time as the designer makes a change to a network within the IC layout. Thus, a designer working in a layout editor can immediately obtain the parasitic value and run an FEOL level (pre-layout) simulation of the selected network (with a lumped capacitor representing the parasitic capacitance inserted therein) quickly. In some embodiments, the near-real-time computation is performed each time a full layout is generated. In some embodiments, the near-real-time computation is performed for a network or portion of the layout, each time the designer makes a layout change in network or portion using a layout editor. In other embodiments, the near-real-time computation is initiated manually by the user at any time prior to running the full RC extraction using the EDA tool design verification suite.

Figure 1:
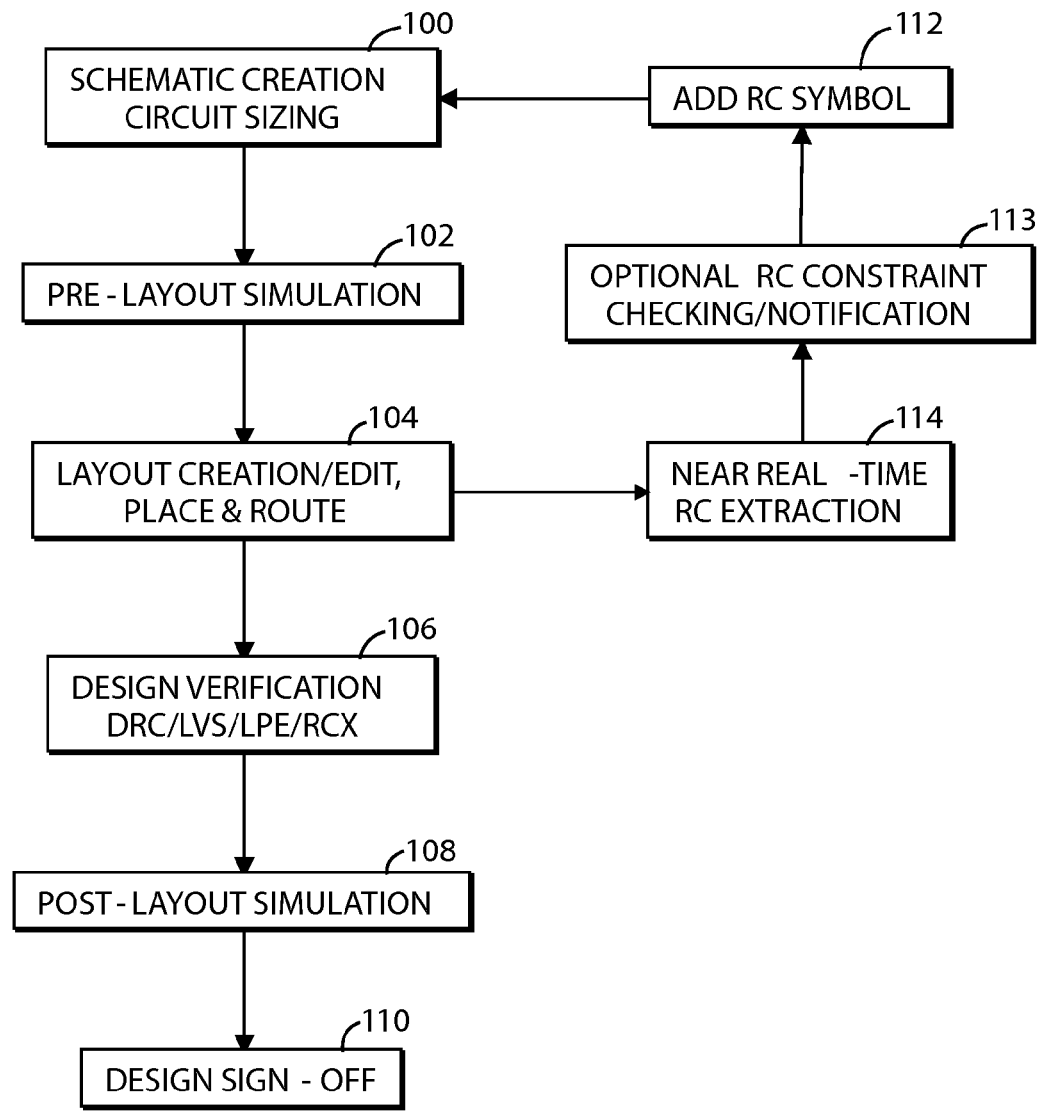
FIG. 1 is a flow chart of a method for parasitic-aware design.

FIG. 1 shows a first embodiment of a method.

At step 100, a device (schematic) level design is created by the designer using an EDA tool. In some embodiments, the designer initially uses an EDA tool to generate a register-transfer-level (RTL) design, and uses a synthesis tool, such as "DC ULTRA", sold by Synopsys, Inc. of Mountain View, Calif. to generate a device level design. In other embodiments, the designer can directly generate a gate level design or device level design using a schematic level editor of the EDA tool. Alternatively, tools such as "ZROUTE"™, or the "VIRTUOSO" custom design platform sold by Cadence, or the Cadence "ENCOUNTER"® digital IC design platform can be used sold by Cadence Design Systems, Inc. of San Jose, Calif. Alternatively, the EDA tool can be "Olympus-SoC" IC implementation system, sold by Mentor Graphics of Wilsonville, Oreg. Other EDA tools can optionally be used. During step 102, the circuits are sized. For example, the designer can modify the design to include a faster transistor to increase performance. At the conclusion of step 100, a schematic level description of the IC design is provided.

At step 102 a pre-layout (FEOL) simulation of the IC is performed. This is a first device level (e.g., SPICE level) simulation which takes into account the active layer devices, including active devices (e.g., transistors and diodes), and other devices (e.g., planar capacitors) formed in the FEOL active device layers. (Capacitors formed in the back-end-of-line interconnect layers are generally included by using certain models during pre-layout simulation. Otherwise, the pre-layout simulation is directed to the devices in the FEOL or active device layers.)

In some embodiments, step 102 is first performed after the initial schematic creation, before the first execution of steps 104 and 114. During this first iteration of step 102, the first device level simulation does not take into account any of the interconnect routings. Subsequently, each time steps 114, 112, and 100 are performed, step 102 is again performed, additionally taking into account a lumped component (capacitor and resistor) which represents one or more estimated parasitic capacitances and resistors in the BEOL interconnect layers.

In some embodiments, if the IC schematic level design fails to meet a performance specification during the first iteration of the pre-layout simulation, the designer immediately returns to step 100 and modifies the design at the schematic level, before continuing further. In other embodiments, as shown in FIG. 1, even if the initial execution of the pre-layout simulation indicates a performance problem exists, the designer performs steps 104, 114 and 112 before returning to step 100.

At step 104, an electronic design automation (EDA) tool 504, including a place and route tool 510, generates a layout of the IC design. The place and route tool 510 (FIG. 5) places the cells in the IC floor plan, and generates the customized conductive routings to interconnect the active layer devices. These BEOL patterns include the conductive line layers (M1, M2, M3, . . . MT) and conductive via layers (V0, V1, V2, . . . VT). These functions can be performed using a tool such as "IC COMPILER"™, sold by Synopsys, Inc. of Mountain View, Calif., or, along with the "VIRTUOSO" chip assembly router, by Cadence. At the conclusion, the layout includes the routing paths for the entire IC. Among these routing paths is a network of routing paths connecting at least two active layer devices of the IC design.

At step 114, after layout creation and place and route, but prior to design verification 106, a near-real-time RC extraction tool 518 (FIG. 5) estimates parasitic capacitances of the routing paths of the network. In some embodiments, step 114 of FIG. 1 is automatically performed for all routing paths immediately after completion of the first execution of step 104 for the whole IC.

In some embodiments, the lumped capacitance and resistance values calculated from the near-real-time RC tool are optionally verified against RC constraints of the nets. For example, the users can set the RC constraints on the nets of a timing-critical network. An RC constraint checker can use the near-real-time RC tool to calculate the capacitance and resistance of the nets where the RC constraints are set. Then the constraint checker compares the calculated results with the constraint values to determine if the constraint is violated or not. The RC constraint checker can provide the user an immediate notification on display 204 (e.g., this RC constraint checking step 113 may occur immediately after performing step 114 of FIG. 1, before step 112, or between steps 112 and 100.) if the user's RC constraint is exceeded, even before running the pre-layout simulation of step 408. Alternatively, immediately after performing step 418 of FIG. 4, before step 404, or between steps 404 and 406.

In other embodiments, as routing patterns for each layer are generated by the router (of the place and route tool 510) the near real-time extraction and characterization of the layout patterns can be performed by a background computational unit running the RC tool 518, while the router is continuing to generate routing paths for the next interconnect layer.

In other embodiments, upon completion of the first execution of step 104 for the whole IC, the user is immediately prompted to select a network having at least one routing path connecting at least two devices. For example, the user can select a timing-critical network connecting two flip-flops in the design. In one embodiment, the user is given a menu of functions or devices from which to make a selection. In another embodiment, the user is presented with a netlist of the IC, and the user is prompted to select a connection between devices in the netlist.

Figure 2:
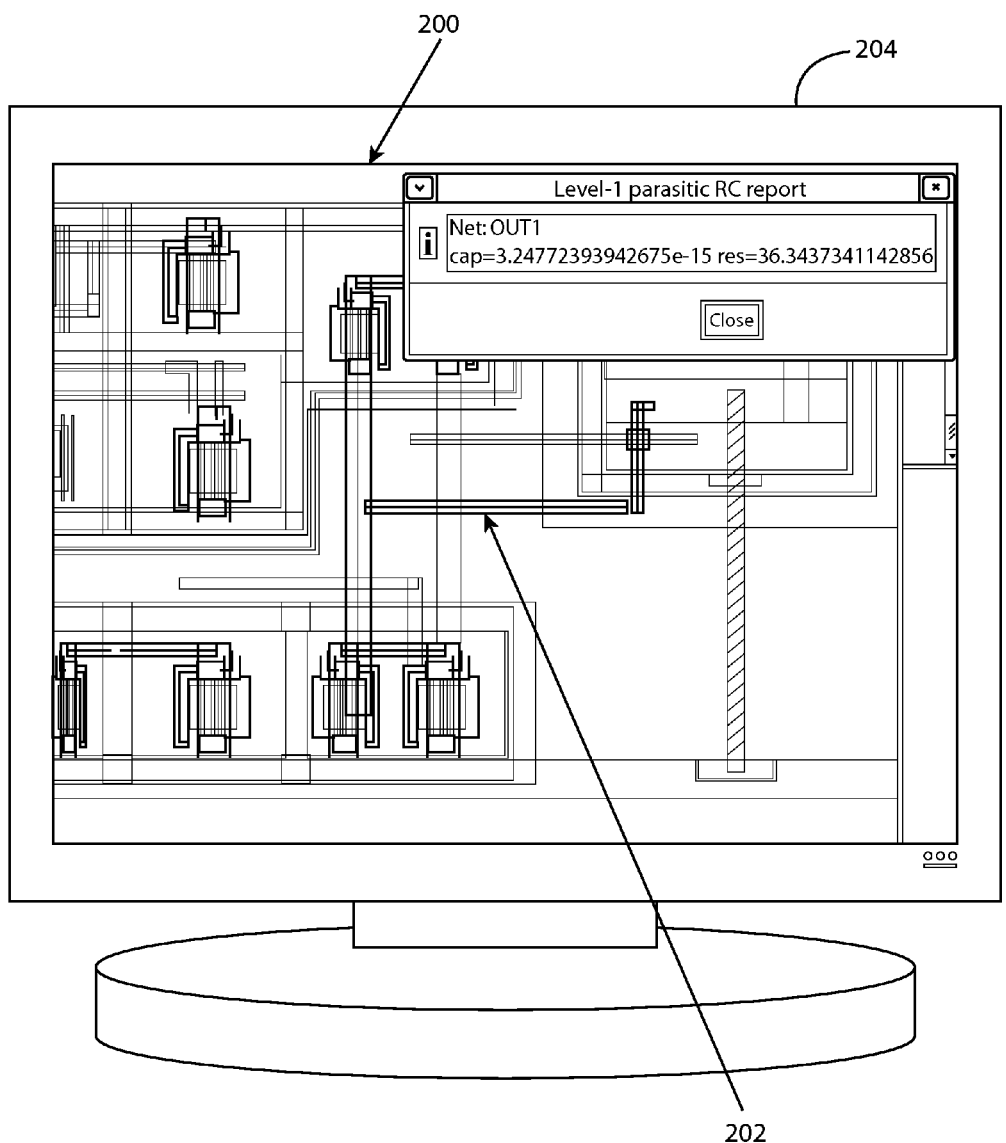
FIG. 2 shows a display of a partial layout including a network to be verified during pre-layout simulation.

In another embodiment, the near-time RC tool 518 (FIG. 5) causes a display device 204 to graphically display the layout or a portion 200 of the layout containing the network, as shown in FIG. 2. The near-time RC tool 518 permits the user to select a network 202 within that portion 200 of the layout. For example, in some embodiments, the user uses a pointing device to make a selection. In some embodiments, the selected network 202 is highlighted in a layout view of the portion of the IC, as shown in FIG. 2. The highlighting can be in the form of a distinctive color, different from the rest of the routing paths in the display. Alternative forms of highlighting can include distinctive line thickness, dashed lines, or the like.

The near-real-time RC extraction tool estimates the parasitic capacitances and resistances for the routing between the devices. The near-real-time RC extraction tool generates a capacitance value of a lumped component (capacitor and resistor) that is to be inserted into the schematic level design for purpose of performing the pre-layout simulation of step 102. Thus, the lumped parasitic capacitance and resistance is back-annotated to the nets in the schematic netlist to have more precise pre-layout simulations.

Figure 7:
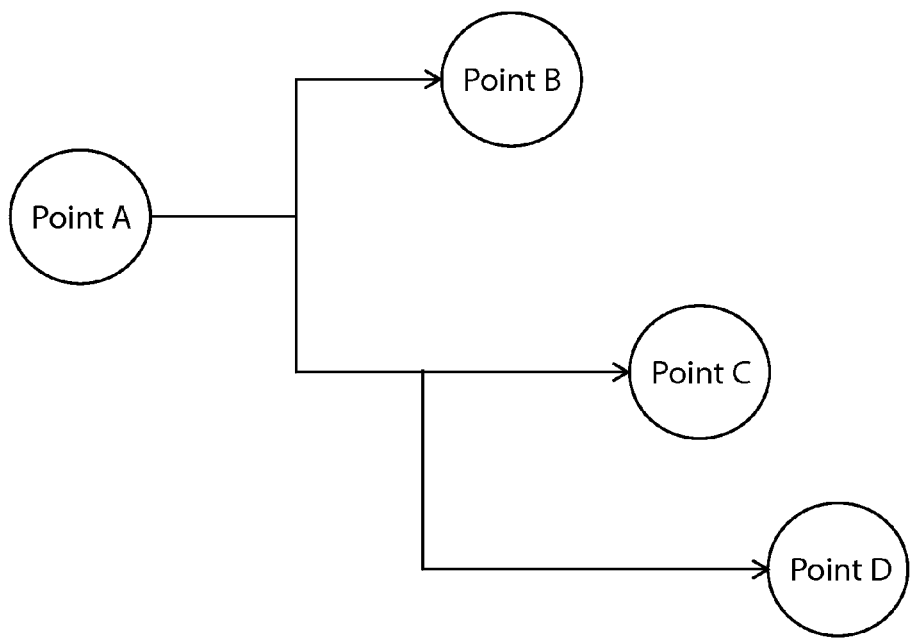
FIG. 7 is a schematic diagram of an example of a network for which the method and system can be used.

In some embodiments, the near-real-time RC extraction tool can generate path resistances in addition to a lumped resistance value. For example, some interconnect networks connect more than two devices, as shown in FIG. 7. Thus, path resistances (i.e., resistance from point A to point B, resistance from point A to point C, resistance from point A to point D, etc.) are computed from driving output to device input.

In another embodiment, the near-real-time RC extraction tool generates an equivalent RC network that is to be back-annotated to the schematic level design to have more accurate simulation.

Figure 3:
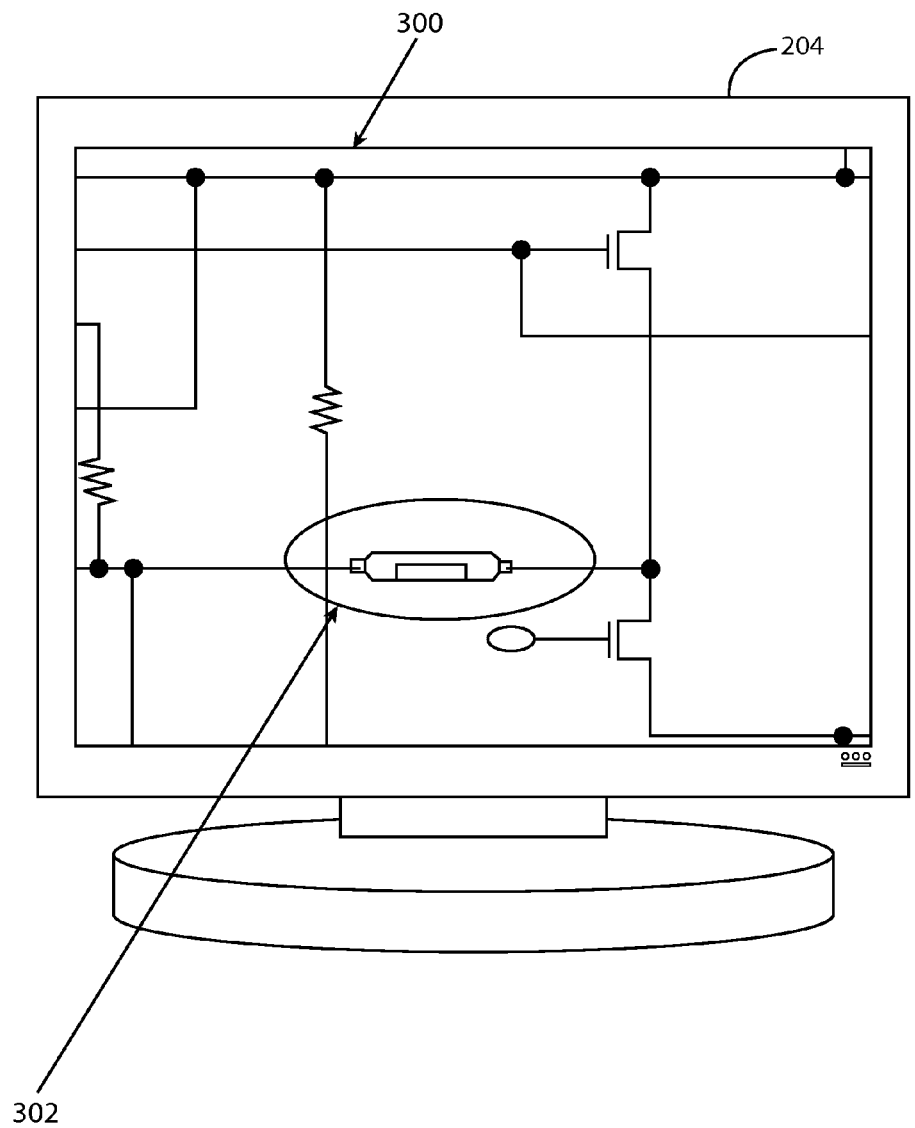
FIG. 3 is a display of a partial schematic showing the network of FIG. 2, with a representation of a lumped capacitor representing parasitic capacitance.

At step 112, in some embodiments, the near-real-time RC tool causes the display device 204 to display a schematic view 300 of the selected network, as shown in FIG. 3. The schematic view 300 includes a symbol 302 representing a lumped capacitor or an RC network having the capacitance and resistance values of the parasitic capacitance and resistance computed in step 114.

Referring again to FIG. 1, with the parasitic capacitance now identified, the user can now perform step 100 to modify the design at the schematic level. For example, the user can quickly tune or modify the circuit sizing or manually edit one or more routing paths in the layout to compensate for the parasitic capacitances.

Subsequently, when step 102 is again executed, the lumped capacitor representing the parasitic capacitance is included in the simulation, along with the actual devices in the active device layers. The second and subsequent iterations of the pre-layout simulation are based on active layer devices and the lumped parasitic capacitances. The pre-layout simulation excludes interconnect routings except for the estimated parasitic capacitance.

Thus, the pre-layout simulation more accurately reflects the timing that will be observed in the post-layout simulation. However, because the design modifications are made before steps 106 and 108 are performed, the design flow described herein is considerably faster, especially if the loop including steps 102, 104, 114, 112 and 100 is reiterated multiple times.

In some embodiments, a first device level simulation of the network is performed based on the at least two active layer devices and the estimated parasitic capacitances. Thus, the re-iteration of steps 102, 104, 114, 112 and 100 can be performed on one or more timing-critical networks, instead of the entire IC design. This can further increase the design cycle, especially if the designer performs multiple iterations for the network, until the first device level simulation satisfies the IC specification.

At step 106, the design and layout verification steps are performed, including DRC, LVS, LPE and RCX. In this case, the verification tasks are performed using the programs 512 within the EDA tool. The RC extraction outputs a complete set of parasitic capacitances for use in the post-layout simulation. Thus, the estimated capacitance from the near-real time RC tool 518 are only used in the pre-layout simulation 102.

At step 108, a full post-layout simulation is performed, using the parasitic capacitances from the RC extraction of step 112 performed by the verification function 512 (FIG. 5) of the EDA tool 504. Because the parasitic capacitances have been included in the pre-layout simulation 102 of the schematic design, the likelihood that the post-layout simulation will indicate that specifications are met is greatly increased. The likelihood that further changes to the design are needed after step 108 are greatly decreased.

At step 110 of FIG. 1, the design is ready for sign-off and tapeout. The revised layout of the IC design is output to a non-transitory, machine readable storage medium after completion of steps 114, 100, and 104, to be accessed by the EDA tool to perform photomask generation and IC fabrication.

Figure 4:
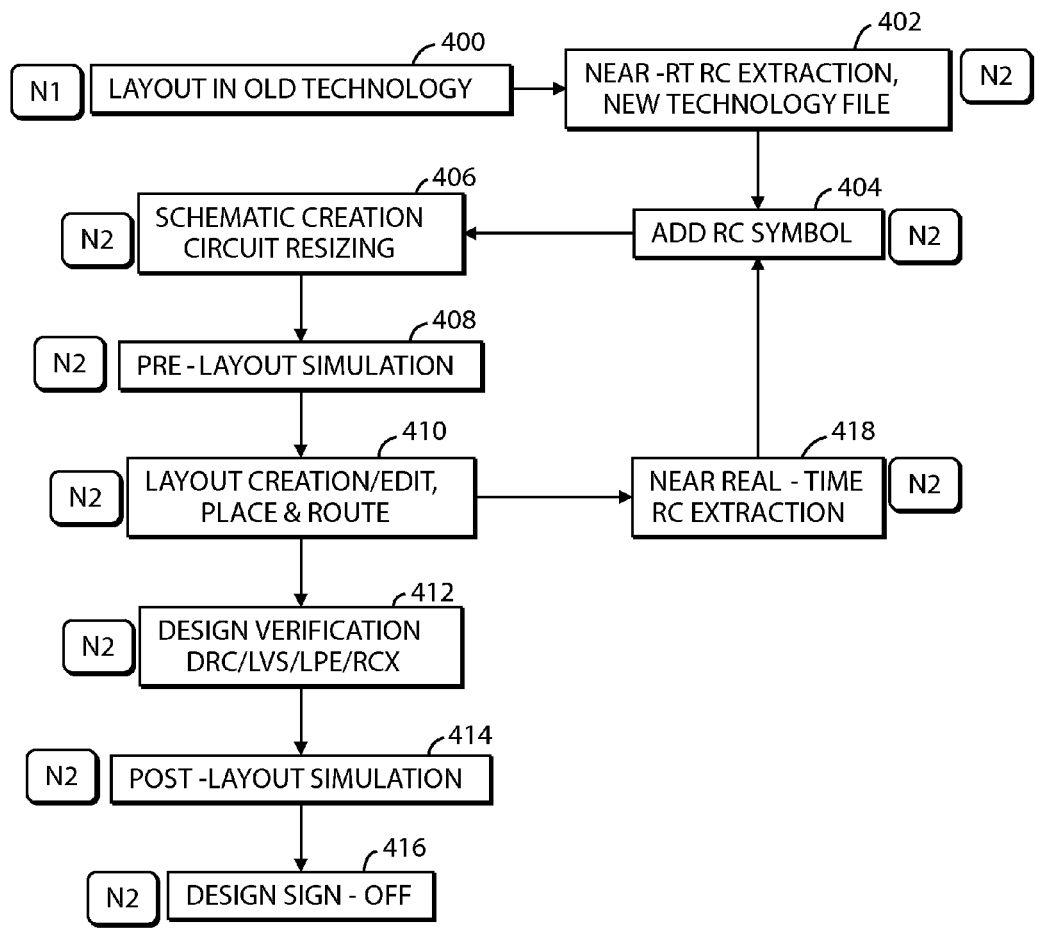
FIG. 4 is a flow chart of an application of the method for rapidly porting a previously verified layout to a new technology node.

FIG. 4 shows another application of the technique of FIG. 1. The general method of FIG. 1 is applied to porting an existing design from a first technology node N1 (e.g., 40 nm CMOS process) to a second technology node N2 (e.g., 28 nm CMOS process). These two technology nodes are only examples, and the method may be used to port the design between any two technologies. For example, the designer may currently be producing ICs at the first technology node N1, and may wish to take advantage of the space savings of the newer technology node N2, without repeating the entire design process.

At step 400, a verified IC layout is provided in the older technology N1. This includes the BEOL interconnect layers of the verified IC layout, in their original sizes.

Figure 5:
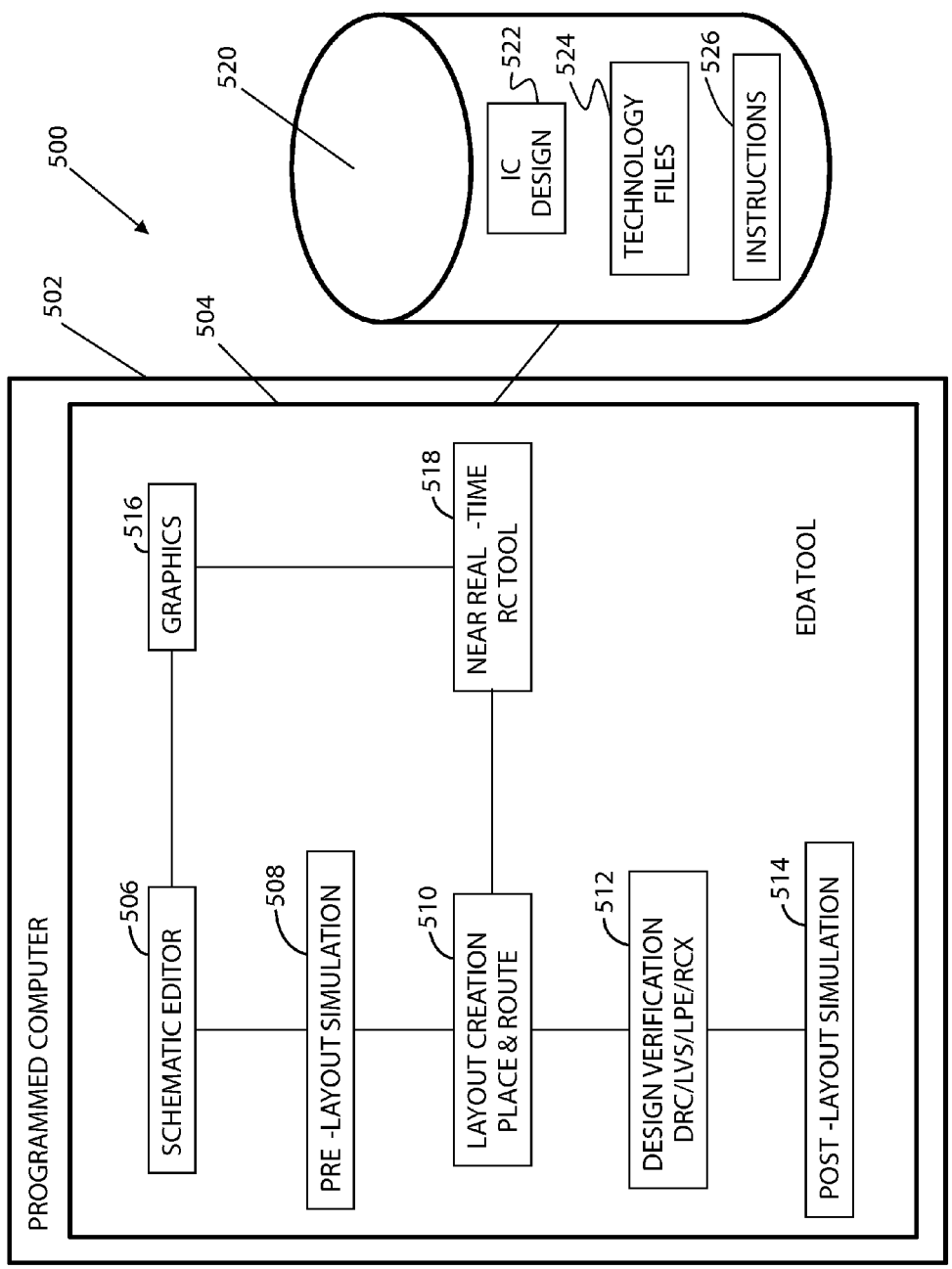
FIG. 5 is a block diagram of a system for performing the method.

At step 402, the previously verified IC layout is provided to the near-real-time RC tool 518 of FIG. 5, along with the technology file associated with the new technology node N2. The parasitic values are estimated for the new technology node N2 (e.g., 28 nm) based on the pre-existing layout in old technology node N1 (e.g., 40 nm) and using the technology file for node N2.

The parasitic capacitances estimated in step 402 (based on the old N1 layout) are resized using a shrink factor based on the first and second technology nodes. In some embodiments, the shrink factor is a first order estimate based on the ratio of the critical dimension (CD) at node N2 to the CD at node N1. For example, if the CD for node N1 is 40 nm and the CD for node N2 is 28 nm. As a first order approximation, when the CD is reduced, the layout size is correspondingly reduced. Thus:

$$\text{Shrink Factor (SF)} = 28/40 = 0.7. \quad (1)$$

$$\text{Parasitic (28 nm)} \sim 0.7 * \text{Parasitic (40 nm)} \quad (2)$$

At step 404, in some embodiments, the near-real-time RC tool 518 causes the display device 204 to display a schematic view 300 of the layout, as shown in FIG. 3 and discussed above. The schematic view 300 includes symbols 302 representing lumped capacitors having the capacitance values of the parasitic capacitances computed in step 402.

At step 406, the extracted parasitic values, multiplied by the shrunk factor as described in equation (2) are then added to the schematic and netlist of the design for the second technology node N2.

The remainder of the process is similar to that described above in FIG. 1, with the steps carried out using the schematic design and technology file at the second technology node N2.

At step 408, a pre-layout simulation is performed using the N2 technology node schematic and the estimated parasitic capacitances. Thus, the layout parasitics of the new technology are emulated during the initial circuit resizing. This improves the initial resized design, to reduce the number of modifications and reduce the length of the design cycle for porting the IC design to the new technology.

If the performance specifications are not met, then following step 410, the loop of steps 418, 404, 406 and 408 is repeated one or more times, in the manner described above with reference to FIG. 1, until the specifications are met. For brevity, the details are not all repeated.

At step 410 a new layout is generated (or edited) for the N2 technology node, using the place and route tool.

At step 418, after the first execution of step 410 at the new technology node N2, the new N2 layout is provided to the near-real-time RC module 518 to provide more accurate estimated parasitic capacitances for the N2 design. Because these estimated parasitics are based on a new N2 technology node layout, the shrink factor is not applied to the parasitic capacitances computed based on the N2 layout of step 410. Thus, in subsequent reiterations of steps 404, 406, and 408, the computed parasitic values at the new technology node are computed directly by the RC module 518.

At step 412, the verification the design and layout verification steps are performed, including DRC, LVS, LPE and RCX. In this case, the verification tasks are performed using the programs 512 within the EDA tool. The RC extraction outputs a complete set of parasitic capacitances for use in the post-layout simulation.

At step 414, a full post-layout simulation is performed, using the parasitic capacitances from the RC extraction of step 412 performed by the verification function of the EDA tool 504. Because the parasitic capacitances have been included in the pre-layout simulation 102 of the schematic design, the likelihood that the post-layout simulation will indicate that specifications are met is greatly increased. The likelihood that further changes to the design are needed after step 108 are greatly decreased.

At step 416, the design is ready for sign-off and tapeout. The revised layout of the IC design is output to a non-transitory, machine readable storage medium after completion of steps 418, 404, 406, and 408, to be accessed by the EDA tool to perform photomask fabrication and IC fabrication.

FIG. 5 is a block diagram of one embodiment of a system 500 for performing the methods described above. The system comprises an electronic design automation (EDA) tool 504, for generating a schematic design of an integrated circuit (IC), generating a layout from the schematic design, and verifying the schematic design and layout. The EDA tool 504 is a special purpose computer. In some embodiments, the EDA tool is hosted on a general purpose processor 502 specially configured by software program instructions 526 to configure the logic circuitry of the processor to perform the IC design functions of generating a schematic design of an integrated circuit (IC), generating a layout from the schematic design, and verifying the schematic design and layout.

In some embodiments, the EDA tool 504 includes tool such as "IC COMPILER"™, sold by Synopsys, Inc. of Mountain View, Calif., or, along with the "VIRTUOSO" chip assembly router, or Cadence "ENCOUNTER"® digital IC design platform by Cadence Design Systems, Inc. Alternatively, the EDA tool can be "Olympus-SoC" IC implementation system, sold by Mentor Graphics of Wilsonville, Oreg.

The EDA tool 504 includes a schematic level editor 506, a pre-layout (FEOL) simulator 508, modules 510 for place and route functions, modules 512 for DRC/LVS, LPE and RCX, a post layout (BEOL) simulator 514. The EDA tool 504 also has graphical display modules 516 for displaying schematics or portions thereof, and layouts or portions thereof At least one non-transitory, computer readable storage medium 520 is provided, for storing data representing the IC design 522 (including schematic design and the layout), the layout having a network of routing paths connecting at least two active layer devices of the IC design.

Figure 6:
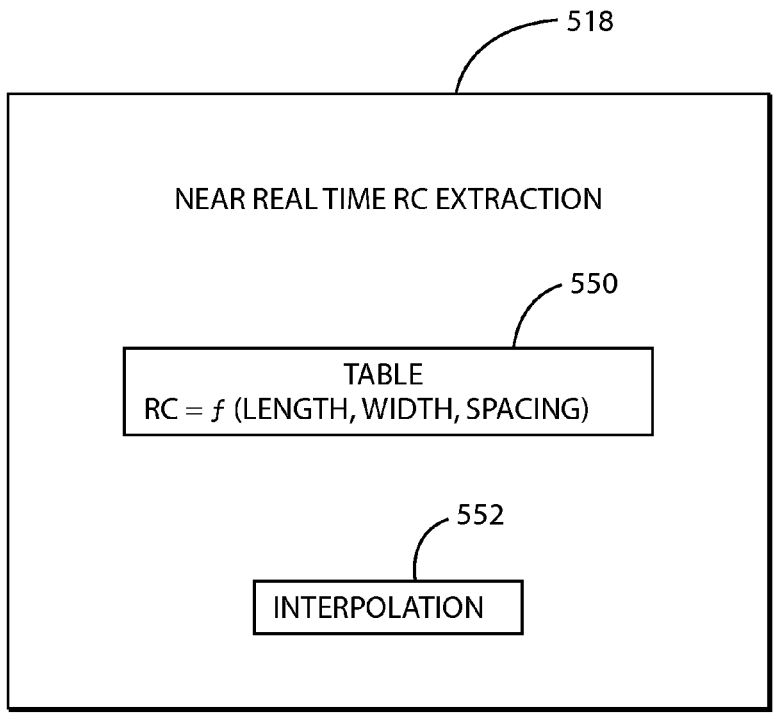
FIG. 6 is a block diagram of the RC tool shown in FIG. 6.

A near-real-time RC tool 518 as shown in FIG. 6 computes parasitic capacitances for a set of inputs corresponding to the layout, or a portion of the layout. The RC tool can compute estimated parasitic capacitances for the routing paths of the network before verifying the schematic design and layout, and for inserting a capacitor corresponding to the estimated parasitic capacitance into the data representing the schematic design of the IC. Thus, the RC tool 518 is configured for computing estimated parasitic capacitances for the network without using outputs of the design rule checks, layout-versus-schematic checks, layout parameter extraction and RC extraction of the IC design.

The calculation in the near-real-time RC extraction module 518 is based on the back-end models and/or technology files (either one). The near-real-time RC extraction module works on layout platforms enables an on-the-fly visualization of layout parasitic values (i.e. Resistance, Capacitance), so that the users can justify between scenarios or find an alternative to meet electrical constraints.

As shown in FIG. 6, the RC tool 518 includes a table 550 stored in the at least one non-transitory, machine readable storage medium 520. The table 550 contains a plurality of previously computed parasitic capacitance values corresponding to respective combinations of line length, line width and line spacing.

In some embodiments, the table 550 is populated by generating parasitic capacitance values for a plurality of routing sizes and configurations, including patterns of various shapes, using the "EXACT" RC field solver, by Simucad Design Automation Inc., of Santa Clara, Calif. The "EXACT" program is capable of performing interconnect parasitic characterization for nanometer semiconductor processes.

The RC tool has an interpolation module 552 configured for interpolating between parasitic capacitance values in the table to compute parasitic capacitance coupling values for combinations of line length, line width and line spacing which are not included in the table. The interpolation module 552 can provide linear interpolation, or higher order interpolation.

The RC tool 518 is used by accessing the table 552 containing a plurality of previously computed parasitic capacitance values corresponding to respective combinations of line length, line width and line spacing; and interpolating between parasitic capacitance values in the table to compute parasitic capacitance coupling values for combinations of line length, line width and line spacing which are not included in the table. The table look-up and interpolation are faster than performing a custom RC extraction for each individual interconnect path in the layout.

Using the above capabilities, the near-real-time RC extraction tool 518 works before the design LVS is cleaned. Thus, the user can update the parasitic values of a modified layout, and incorporate the parasitic capacitance in the schematic for pre-layout simulation anytime. The designer does not need to wait until post-layout simulation.

In some embodiments, a method comprises: (a) generating a layout of an integrated circuit (IC) design using an electronic design automation (EDA) tool, the layout having a network of routing paths connecting at least two active layer devices of the IC design; (b) computing estimated parasitic capacitances of the routing paths of the network; (c) performing a first device level simulation of the network based on the at least two active layer devices and the estimated parasitic capacitances; (d) using the EDA tool to revise the layout or a device of the IC design if a result of the first device level simulation fails to satisfy an IC specification, wherein steps (b), (c) and (d) are performed one or more times, until a result of the first device level simulation satisfies the IC specification; and (e) outputting the revised layout of the IC design to a non-transitory, machine readable storage medium after completion of steps (b) to (d), to be accessed by the EDA tool to perform design verification.

In some embodiments, a non-transitory, computer readable storage medium encoded with computer program instructions, such that when the computer program instructions are executed by a computer, the computer acts as a special purpose processor for performing a method comprising: (a) generating a layout of an integrated circuit (IC) design using an electronic design automation (EDA) tool, the layout having a network of routing paths connecting at least two active layer devices of the IC design; (b) computing estimated parasitic capacitances of the routing paths of the network; (c) performing a first device level simulation of the network based on the at least two active layer devices and the estimated parasitic capacitances; (d) using the EDA tool to revise the layout or a device of the IC design if a result of the first device level simulation fails to satisfy an IC specification, wherein steps (b), (c) and (d) are performed one or more times, until a result of the first device level simulation satisfies the IC specification; and (e) outputting the revised layout of the IC design to a non-transitory, machine readable storage medium after completion of steps (b) to (d), to be accessed by the EDA tool to perform design verification.

In some embodiments, a system comprises an electronic design automation (EDA) tool, for generating a schematic design of an integrated circuit (IC), generating a layout from the schematic design, editing the layout, and verifying the schematic design and layout. At least one non-transitory, computer readable storage medium, is provided for storing data representing the schematic design and the layout, the layout having a network of routing paths connecting at least two active layer devices of the IC design. An RC tool is provided for computing estimated parasitic capacitances of the routing paths of the network before verifying the schematic design and layout, and for inserting a capacitor corresponding to the estimated parasitic capacitance into the data representing the schematic design of the IC. A first device level simulation tool for simulating performance of the network based on the at least two active layer devices and the estimated parasitic capacitances.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
   (a) generating a layout of an integrated circuit (IC) design using an electronic design automation (EDA) tool, the layout having a network of routing paths connecting at least two active layer devices of the IC design;
   (b) computing estimated parasitic capacitances of the routing paths of the network;
   (c) performing a first device level simulation of the network based on the at least two active layer devices and the estimated parasitic capacitances;
   (d) using the EDA tool to revise the layout or a device of the IC design if a result of the first device level simulation fails to satisfy an IC specification;
       wherein steps (b), (c) and (d) are performed one or more times before performing design rule checks and before performing layout-versus-schematic checks, until a result of the first device level simulation satisfies the IC specification; and
   (e) outputting the revised layout of the IC design to a non-transitory, machine readable storage medium after completion of steps (b) to (d), to be accessed by the EDA tool to perform design verification.

2. The method of claim 1, wherein the first device level simulation is a pre-layout simulation based on active layer devices, the pre-layout simulation excluding interconnect routings except for the estimated parasitic capacitance of step (b).

3. The method of claim 1, further comprising:
   automatically comparing the estimated parasitic capacitances of the routing paths of the network to respective predetermined values; and
   providing a notification if one of the predetermined values is exceeded.

4. A method comprising:
   providing a previously verified integrated circuit (IC) design implemented at a first technology node and having routing paths, the IC design to be ported to a second technology node being different from the first technology node;
   using an electronic design automation (EDA) tool to compute estimated parasitic capacitances of the routing paths of the previously verified IC design using a technology file associated with the second technology node; and
   estimating parasitic capacitances using a shrink factor based on the first and second technology nodes, wherein the step of using the EDA tool to compute estimated parasitic capacitances includes:
   accessing a table stored in a non-transitory, machine readable storage medium, the table containing a plurality of previously computed parasitic capacitance values corresponding to respective combinations of line length, line width and line spacing.

5. The method of claim 4, further comprising:
   performing design rule checks, layout-versus-schematic checks, layout parameter extraction and RC extraction of the IC design at the second technology node using the EDA tool, where the step of performing design rule checks is not performed for the IC design at the second technology node until after the resizing step is completed.

6. The method of claim 5, further comprising:
   performing a post-layout simulation after the step of performing design rule checks.

7. The method of claim 4, wherein the step of using the EDA tool to compute estimated parasitic capacitances further includes:
   interpolating between parasitic capacitance values in the table to compute parasitic capacitance coupling values for combinations of line length, line width and line spacing which are not included in the table.

8. The method of claim 4, further comprising:
   causing a display device to display a portion of a layout containing the IC design.

9. The method of claim 4, further comprising causing a display device to display a schematic of a portion of the IC design, with a symbol representing a lumped device having one of the parasitic capacitances.

10. The method of claim 4, wherein the shrink factor is a ratio of a critical dimension of the second technology node to a critical dimension of the first technology node.

11. A non-transitory, computer readable storage medium encoded with computer program instructions, such that when the computer program instructions are executed by a computer, the computer acts as a special purpose processor for performing a method comprising:
    (a) generating a layout of an integrated circuit (IC) design using an electronic design automation (EDA) tool, the layout having a network of routing paths connecting at least two active layer devices of the IC design;
    (b) computing estimated parasitic capacitances of the routing paths of the network;
    (c) performing a first device level simulation of the network based on the at least two active layer devices and the estimated parasitic capacitances;
    (d) using the EDA tool to revise the layout or a device of the IC design if a result of the first device level simulation fails to satisfy an IC specification;
        wherein steps (b), (c) and (d) are performed one or more times before performing design rule checks and before performing layout-versus-schematic checks, until a result of the first device level simulation satisfies the IC specification; and
    (e) outputting the revised layout of the IC design to a non-transitory, machine readable storage medium after completion of steps (b) to (d), to be accessed by the EDA tool to perform design verification.

12. The non-transitory, computer readable storage medium of claim 11, wherein the first device level simulation is a pre-layout simulation based on active layer devices, the pre-layout simulation excluding interconnect routings except for the estimated parasitic capacitance of step (b).

13. The non-transitory, computer readable storage medium of claim 11, further comprising:
(f) performing design rule checks, layout-versus-schematic checks, layout parameter extraction and RC extraction of the IC design using the EDA tool,
where step (f) is not performed for the IC design until after step (d) is completed.

14. The non-transitory, computer readable storage medium of claim 11, wherein step (b) includes:
accessing a table stored in a non-transitory, machine readable storage medium, the table containing a plurality of previously computed parasitic capacitance values corresponding to respective combinations of line length, line width and line spacing.

15. The non-transitory, computer readable storage medium of claim 14, wherein step (b) further includes:
interpolating between parasitic capacitance values in the table to compute parasitic capacitance coupling values for combinations of line length, line width and line spacing which are not included in the table.

16. A system comprising:
an electronic design automation (EDA) tool, for generating a schematic design of an integrated circuit (IC), generating a layout from the schematic design, editing the layout, and verifying the schematic design and layout;
at least one non-transitory, computer readable storage medium, for storing data representing the schematic design and the layout, the layout having a network of routing paths connecting at least two active layer devices of the IC design;
an RC tool for computing estimated parasitic capacitances of the routing paths of the network before verifying the schematic design and layout, and before performing design rule checks and before performing layout-versus-schematic checks, and for inserting a capacitor corresponding to the estimated parasitic capacitance into the data representing the schematic design of the IC; and
a first device level simulation tool for simulating performance of the network based on the at least two active layer devices and the estimated parasitic capacitances.

17. The system of claim 16, wherein the first device level simulation tool is configured to perform a pre-layout simulation based on active layer devices and the inserted capacitor, the pre-layout simulation excluding interconnect routings.

18. The system of claim 16, wherein the EDA tool is configured for performing design rule checks, layout-versus-schematic checks, layout parameter extraction and RC extraction of the IC design, and the RC tool is configured for computing estimated parasitic capacitances for the network without using outputs of the design rule checks, layout-versus-schematic checks, layout parameter extraction and RC extraction of the IC design.

19. The system of claim 16, wherein the RC tool includes:
a table stored in the at least one non-transitory, machine readable storage medium, the table containing a plurality of previously computed parasitic capacitance values corresponding to respective combinations of line length, line width and line spacing.

20. The system of claim 19, wherein the RC tool is configured for interpolating between parasitic capacitance values in the table to compute parasitic capacitance coupling values for combinations of line length, line width and line spacing which are not included in the table.

\* \* \* \* \*